(12) United States Patent
Chi et al.

(10) Patent No.: US 12,011,670 B2
(45) Date of Patent: Jun. 18, 2024

(54) HAND CONTROLLER ASSEMBLY

(71) Applicant: HTC Corporation, Taoyuan (TW)

(72) Inventors: Chia Hsiang Chi, Taoyuan (TW);
Chang-Hua Wei, Taoyuan (TW); Yu Lin Huang, Taoyuan (TW); Wei Te Tu, Taoyuan (TW); YenHsun Chen, Taoyuan (TW); Jung Lung Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 528 days.

(21) Appl. No.: 17/474,062

(22) Filed: Sep. 14, 2021

(65) Prior Publication Data

US 2022/0134240 A1 May 5, 2022

Related U.S. Application Data

(60) Provisional application No. 63/108,876, filed on Nov. 3, 2020.

(51) Int. Cl.
*A63F 13/98* (2014.01)
*A63F 13/24* (2014.01)

(52) U.S. Cl.
CPC .............. *A63F 13/98* (2014.09); *A63F 13/24* (2014.09); *A63F 2300/1043* (2013.01)

(58) Field of Classification Search
CPC .. A63F 13/98; A63F 13/24; A63F 2300/1043; G06F 3/014
See application file for complete search history.

(56) References Cited

U.S. PATENT DOCUMENTS

| 10,209,738 B1 | 2/2019 | Tompkins et al. |
|---|---|---|
| 2006/0075605 A1 | 4/2006 | Lagaly et al. |
| 2019/0232160 A1 | 8/2019 | Hope et al. |
| 2020/0246691 A1 | 8/2020 | Petersen et al. |
| 2021/0333759 A1* | 10/2021 | Vasavada ............... H04N 23/57 |

FOREIGN PATENT DOCUMENTS

| CN | 208922524 | 5/2019 |
|---|---|---|
| CN | 209765445 | 12/2019 |
| DE | 202018004060 | 9/2018 |
| JP | H05130472 | 5/1993 |
| JP | 2003111902 | 4/2003 |

OTHER PUBLICATIONS

"Office Action of Taiwan Counterpart Application", issued on Mar. 22, 2022, p. 1-p. 3.
"Office Action of China Counterpart Application", issued on Jul. 18, 2023, p. 1-p. 6.

\* cited by examiner

*Primary Examiner* — Jeffrey S Vanderveen
(74) *Attorney, Agent, or Firm* — JCIPRNET

(57) ABSTRACT

A hand controller assembly including a hand controller, a slide rail and a strap. The hand controller has a top and a bottom opposite to each other. The slide rail is disposed at the top and has an entrance and a limiting portion adjacent to the entrance. The strap is detachably assembled to the slide rail and the bottom. The strap includes a body and a metal member. The metal member is assembled to one end of the body. The metal member has a sliding block. The sliding block is adapted to be detachably assembled to the slide rail via the entrance along a direction. The sliding block is adapted to move along the limiting portion. The limiting portion restricts the movement of the sliding block along the direction.

7 Claims, 6 Drawing Sheets

HAND CONTROLLER ASSEMBLY

CROSS-REFERENCE TO RELATED APPLICATION

This application claims the priority benefit of U.S. Provisional Application No. 63/108,876, filed on Nov. 3, 2020. The entirety of the above-mentioned patent application is hereby incorporated by reference herein and made a part of this specification.

BACKGROUND OF THE INVENTION

Field of the Invention

The present application relates to a hand controller assembly, and particularly relates to a hand controller assembly that is easy to adjust.

Description of Related Art

Virtual reality (VR) techniques are becoming more and more popular, wherein the most common input device is a hand controller. In order to prevent the hand controller from being dropped and broken, generally a hand strap connected to the hand controller is fixed to the user's hand. Different users have different palm sizes, so the strap may interfere with some users when pressing buttons.

SUMMARY OF THE INVENTION

The present application provides a hand controller assembly that may alleviate the issue that user experience is affected by the size of the palm of the user.

A hand controller assembly of the present application includes a hand controller, a slide rail, and a strap. The hand controller has a top and a bottom opposite to each other. The slide rail is disposed at the top and has an entrance and a limiting portion adjacent to the entrance. The strap is detachably assembled to the slide rail and the bottom. The strap includes a body and a metal member. The metal member is assembled to one end of the body. The metal member has a sliding block. The sliding block is adapted to be detachably assembled to the slide rail via the entrance along a direction. The sliding block is adapted to move along the limiting portion. The limiting portion restricts a movement of the sliding block along the direction.

Based on the above, the hand controller assembly of the present application provides the function of an adjustable connecting position of the hand controller and the strap, so as to conform to palms of different sizes.

DESCRIPTION OF THE EMBODIMENTS

Figure 1:
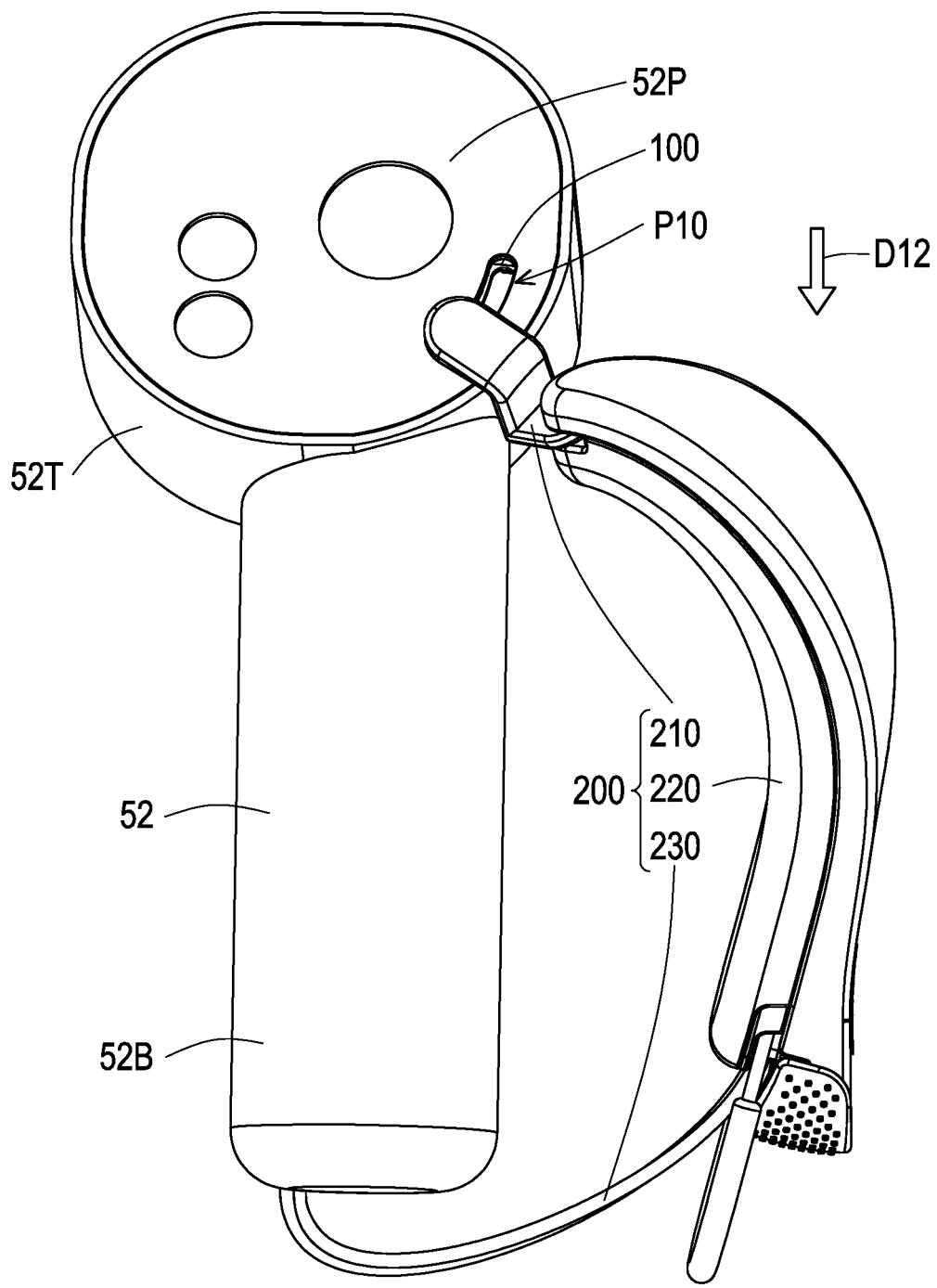
FIG. 1 is a schematic diagram of a hand controller assembly according to an embodiment of the invention.

FIG. 1 is a schematic diagram of a hand controller assembly according to an embodiment of the invention. Please refer to FIG. 1, a hand controller assembly 50 of the present embodiment includes a hand controller 52, a slide rail 100, and a strap 200. The hand controller 52 has a top 52T and a bottom 52B opposite to each other. The control handle 52 is applied to, for example, a virtual reality system, an augmented reality system, or other systems. The virtual reality system includes a hand controller 52 and a host (not shown). The strap 200 is adapted to be worn on a user's hand, and the hand controller 52 may be connected to the host in a wired or wireless manner to transmit signals to and from the host. Moreover, the virtual reality system also includes a head-mounted display (not shown) adapted to be worn on the user's head, and may also be connected to the host in a wired or wireless manner to transmit signals to and from the host. In other embodiments, the host may also be integrated into the head-mounted display.

The slide rail 100 is disposed at the top 52T and has an entrance E10 (marked in FIG. 3) and a limiting portion 120 adjacent to the entrance E10. The strap 200 is detachably assembled to the slide rail 100 and the bottom 52B of the hand controller 52. The strap 200 includes a body 220 and a metal member 210. The metal member 210 is assembled to one end of the body. The metal member 210 has a sliding block 212 (marked in FIG. 4). The sliding block 212 is adapted to be detachably assembled to the slide rail 100 via the entrance E10 along a direction D12. The sliding block 212 is adapted to move along the limiting portion 120 (marked in FIG. 3). The limiting portion 120 restricts the movement of the sliding block 212 along the direction D12.

According to the above, in the hand controller assembly 50 of the present embodiment, the user only needs to push the metal member 210 to move the metal member 210 within the slide rail 100, thereby changing the connecting position between the strap 200 and the hand controller 52. When the user feels that pressing a button is inconvenient, they may adjust and change the connecting position of the strap 200 and the hand controller 52 simply by performing a single-direction movement, so that users of different palm sizes may all have a good use experience.

In the present embodiment, the hand controller 52 has a control panel 52P, and an opening P10 of the slide rail 100 is located at the control panel 52P. In other words, the slide rail 100 is mounted under the control panel 52P. In other embodiments, the slide rail 100 may also be exposed outside the control panel 52P, but the present application is not limited thereto. In addition, a plurality of buttons or touchpads may also be disposed on the control panel 52P.

In the present embodiment, the metal member 210 is detachably clamped on the slide rail 100, but the present application is not limited thereto. With this design, users may not only choose their favorite strap 200, but mandatory cleaning of the strap 200 may also be facilitated. The metal member 210 includes a sliding block 210A, a connecting portion 210B, and a fixing portion 210C (marked in FIG. 7). The fixing portion 210C is configured to fix the metal member 210 to the body 220 of the strap 200, and the connecting portion 210B connects the sliding block 210A and the fixing portion 210C. In the present embodiment, the strap 200 further includes a tether 230 detachably assembled to the bottom 52B of the hand controller 52 and coupled to the body 220.

Figure 2:
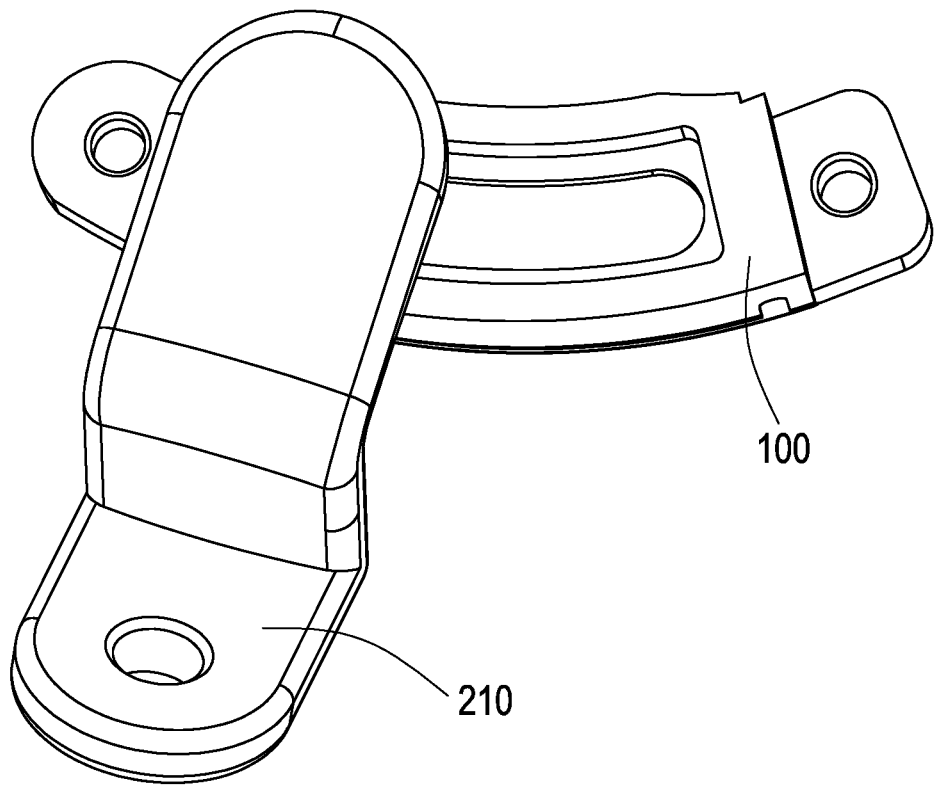
FIG. 2 is a schematic diagram of the connection between the strap and the slide rail of the hand controller assembly of FIG. 1.
Figure 3:
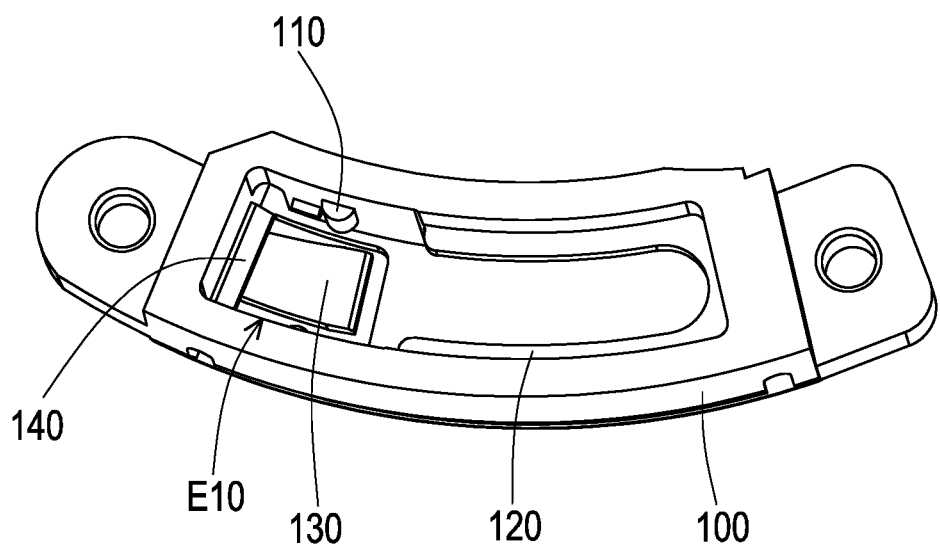
FIG. 3 is a schematic diagram after the metal member in FIG. 2 is removed.

FIG. 2 is a schematic diagram of the connection between the strap and the slide rail of the hand controller assembly of FIG. 1. FIG. 3 is a schematic diagram after the metal member in FIG. 2 is removed. Referring to FIG. 2 and FIG. 3, in the present embodiment, the slide rail 100 has the entrance E10, and FIG. 3 shows the state where the metal member 210 is located at the entrance E10. The metal member 210 of the present embodiment is presented as a single-device type fastener and is connected to other portions of the strap 200, but the present application is not limited thereto. The main material of the strap 200 of the present embodiment is foam. The strap 200 made of foam as the main material may substantially maintain the shape thereof to facilitate the provision of an arc-shaped space for the palm of the user to pass through during the wearing process.

Figure 4:
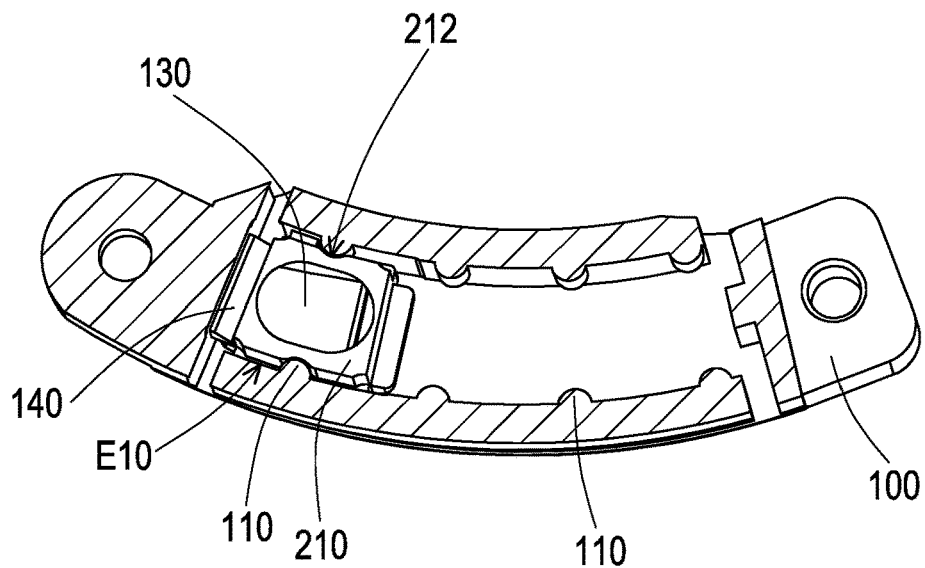
FIG. 4 is a cross-sectional view of FIG. 2.

FIG. 4 is a cross-sectional view of FIG. 2. Referring to FIG. 3 and FIG. 4, in the present embodiment, the sidewall of the slide rail 100 has a plurality of first positioning structures 110, the metal member 210 has a second positioning structure 212, and the second positioning structure 212 is configured to engage one of the first positioning structures 110. In the present embodiment, there are a total of four groups of first positioning structures 110 located at four different positions, and therefore the metal member 210 may be properly clamped at one of these four positions without being readily separated. In the present embodiment, the first positioning structures 110 are convex ribs, and the second positioning structure 212 is a groove. In other embodiments, the first positioning structures 110 and the second positioning structure 212 may also be structurally compatible with each other.

Figure 5:
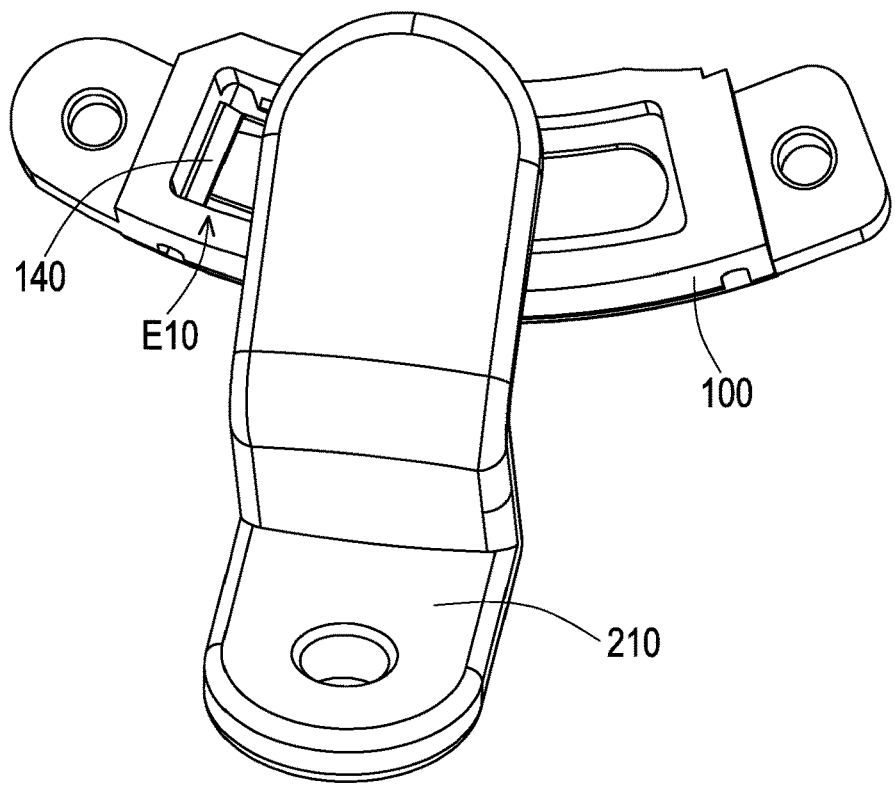
FIG. 5 is a schematic diagram after the metal member of FIG. 2 is moved to another position.
Figure 6:
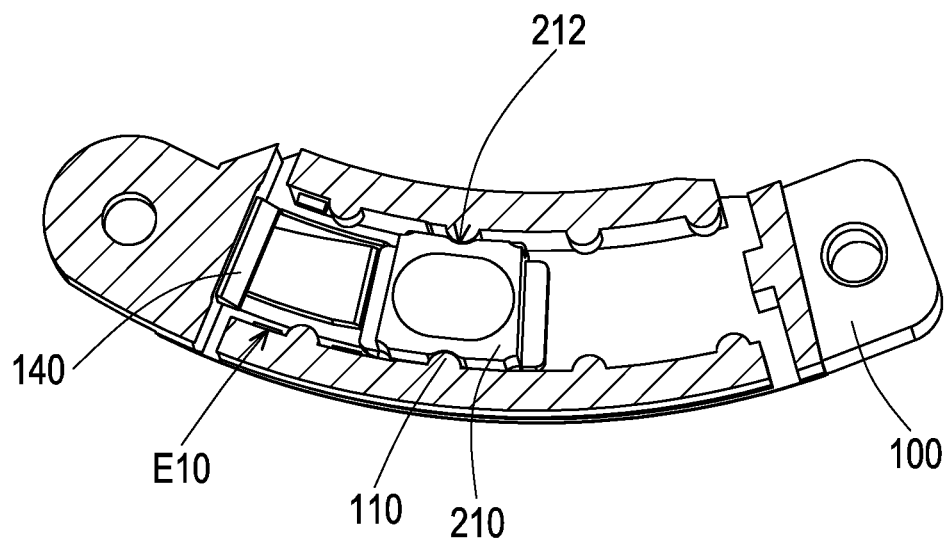
FIG. 6 is a cross-sectional view of FIG. 5.
Figure 7:
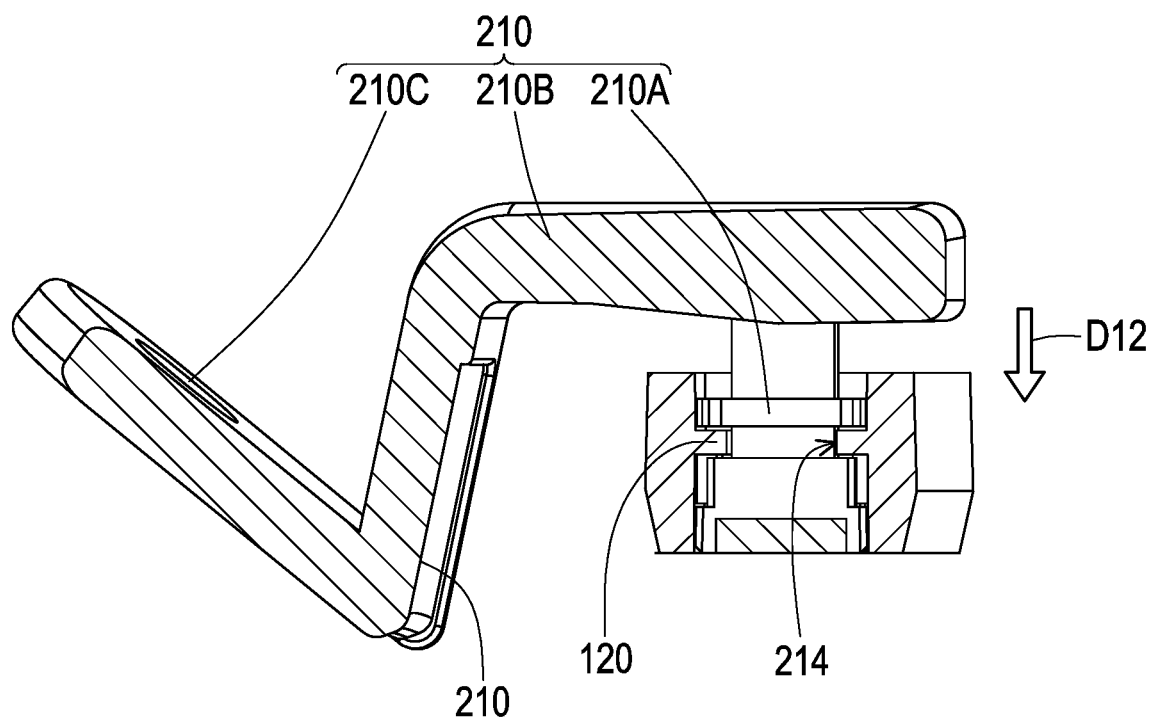
FIG. 7 is a cross-sectional view in another direction of FIG. 5.

FIG. 5 is a schematic diagram after the metal member of FIG. 2 is moved to another position. FIG. 6 is a cross-sectional view of FIG. 5. FIG. 7 is a cross-sectional view in another direction of FIG. 5. Referring to FIG. 3, FIG. 5, and FIG. 7, in the present embodiment, the slide rail 100 has a limiting portion 120. The limiting portion 120 extends on the sidewall of the slide rail 100 excluding the entrance E10. The metal member 210 has a limiting structure 214. The limiting structure 214 is configured to engage the limiting portion 120 to prevent the metal member 210 from leaving the slide rail 100. It may be seen from FIG. 3 that the limiting portion 120 does not extend to the entrance E10, and therefore the limiting portion 120 does not prevent the metal member 210 from entering the slide rail 100 from the entrance E10.

When the metal member 210 slides to the side from the entrance E10, the limiting structure 214 of the metal member 210 is engaged with the limiting portion 120. At this point, the metal member 210 is restricted by the limiting portion 120 and may only slide within the slide rail 100, but may not leave the slide rail 100 at the position of the limiting portion 120 in a direction perpendicular to the sliding direction. It may also be seen in FIG. 6 that the metal member 210 is clamped by another group of first positioning structures 110 to be held in a different position from that in FIG. 4 and may not be readily removed. In the present embodiment, the limiting portion 120 is a convex rib, and the limiting structure 214 is a groove. In other embodiments, the limiting portion 120 and the limiting structure 214 may also be structurally compatible with each other.

Figure 8:
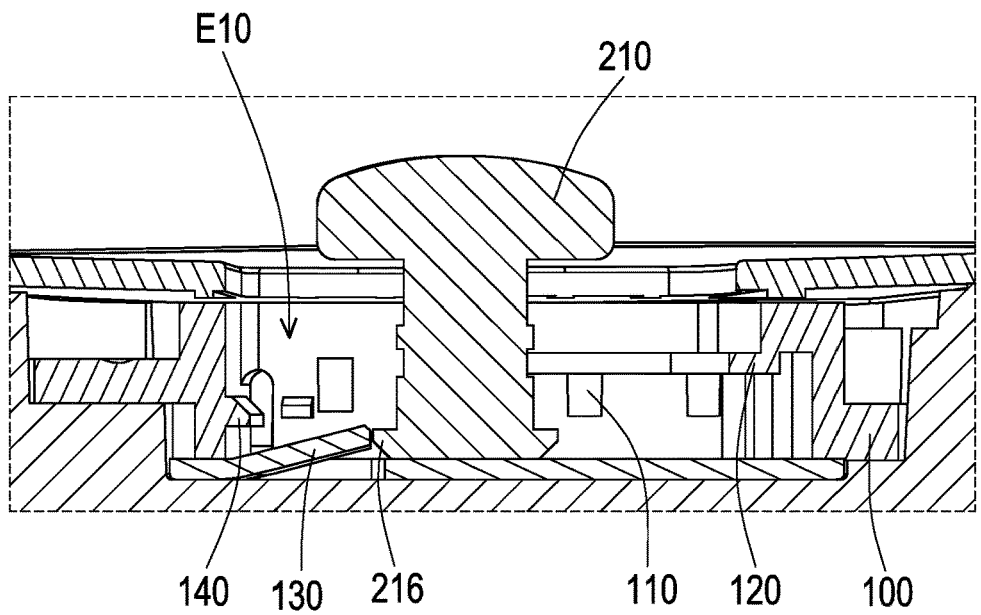
FIG. 8 is a cross-sectional view in still another direction of FIG. 5.

FIG. 8 is a cross-sectional view in still another direction of FIG. 5. Referring to FIG. 4, FIG. 6, and FIG. 8, in the present embodiment, the slide rail 100 has an elastic member 130. The elastic member 130 is located at the bottom of the slide rail 100 and corresponds to the entrance E10, for example, located on the bottom wall of the entrance E10. When the metal member 210 enters the entrance E10, the elastic member 130 is compressed and deformed, as shown in FIG. 4. After the metal member 210 enters the slide rail 100 and leaves the entrance E10, the elastic member 130 is reset and configured to prevent the sliding block 210A of the metal member 210 from entering the entrance E10, as shown in FIG. 6 and FIG. 8. In other words, when the metal member 210 is to move from the position shown in FIG. 8 to the entrance E10, the elastic member 130 resists the metal member 210 and prevents the metal member 210 from moving to the entrance E10. Therefore, after the metal member 210 enters the slide rail 100 from the entrance E10, the metal member 210 may not move to the entrance E10 again, and therefore the issue of the metal member 210 readily leaving the slide rail 100 does not occur. If the metal member 210 is to leave the slide rail 100, the metal member 210 needs to be pushed to press the elastic member 130 so as to allow the metal member 210 to enter the entrance E10 and leave the slide rail 100.

Please refer to FIG. 4 and FIG. 8 again. In the present embodiment, the slide rail 100 has a first one-way tenon 140. The first one-way tenon 140 and the limiting portion 120 are respectively located at two sides of the entrance E10. The first one-way tenon 140 is located on the sidewall of the entrance E10. The sliding block 210A of the metal member 210 has a second one-way tenon 216. The first one-way tenon 140 is configured to cooperate with the second one-way tenon 216. When the metal member 210 enters the slide rail 100 from the entrance E10, the second one-way tenon 216 may pass through the first one-way tenon 140 by applying a small force. Moreover, after the second one-way tenon 216 passes through the first one-way tenon 140, even if the metal member 210 is not yet moved to the side and is restricted by the limiting portion 120, the first one-way tenon 140 still clamps the second one-way tenon 216, so that the metal member 210 may not move along the direction D12 to readily leave the slide rail 100. Of course, when a larger force is applied, the metal member 210 may still overcome the restriction of the first one-way tenon 140 and leave the slide rail 100.

Figure 9:
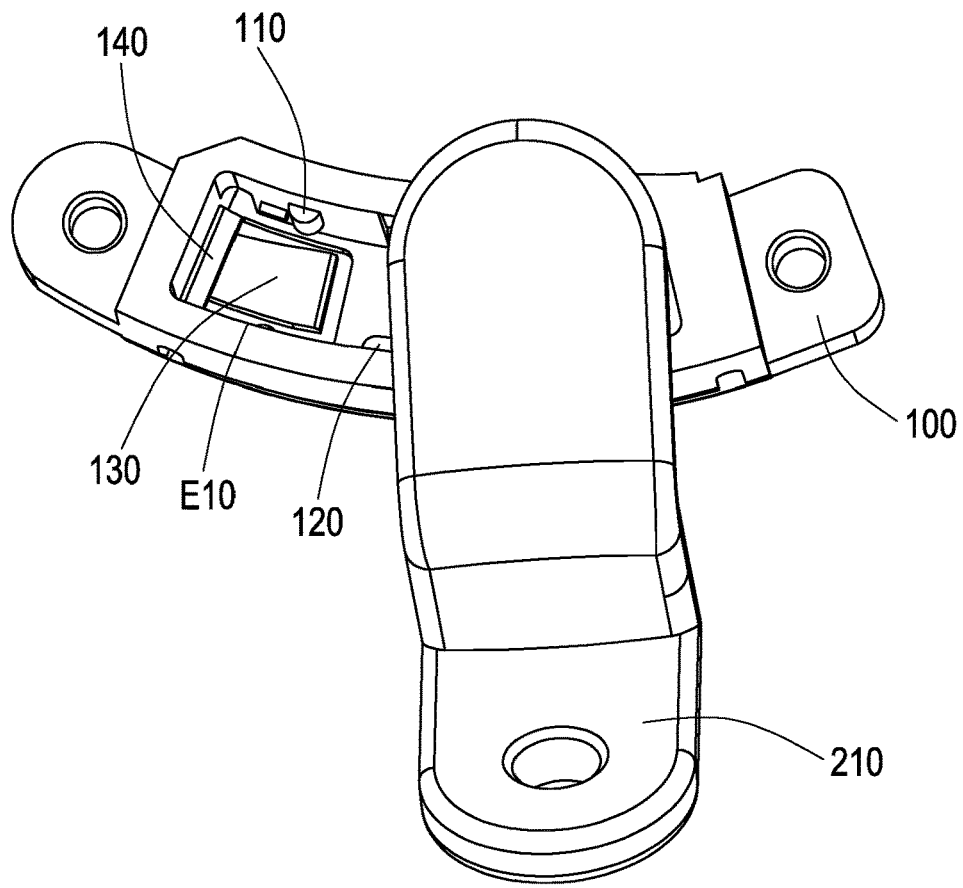
FIG. 9 is a schematic diagram after the metal member of FIG. 2 is moved to still another position.
Figure 10:
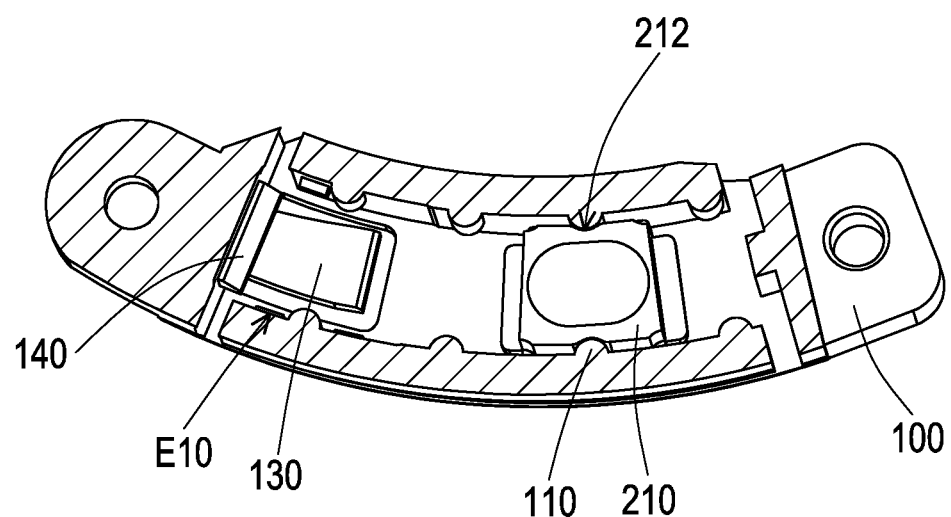
FIG. 10 is a cross-sectional view of FIG. 9.

FIG. 9 is a schematic diagram after the metal member of FIG. 2 is moved to still another position. FIG. 10 is a cross-sectional view of FIG. 9. Please refer to FIG. 9 and FIG. 10, the metal member 210 may also continue to slide from the position shown in FIG. 8 to the position shown in FIG. 9 and FIG. 10. The user only needs to push the metal member 210 with their thumb to adjust and change the connecting position of the strap 200 and the hand controller 52 to suit users with different palm sizes. In addition, the metal member 210 may be continuously pushed to the entrance E10 with the thumb to unlock to facilitate the removal of the strap 200.

Based on the above, in the hand controller assembly of the present application, the strap is connected to the hand controller via the slide rail, and therefore the connecting position of the two is adjustable to suit users of different palm sizes. The metal member is pushed to the entrance in the slide rail to unlock so that the strap may be removed readily. Therefore, both unlocking and adjusting the position of the metal member may be achieved by pushing the metal member to move along the slide rail via the thumb, thus achieving better operation convenience.

What is claimed is:

1. A hand controller assembly, comprising:
a hand controller having a top and a bottom opposite to each other;
a slide rail disposed at the top and having an entrance and a limiting portion adjacent to the entrance; and
a strap detachably assembled to the slide rail and the bottom, wherein the strap comprises:
a body;
a metal member assembled to one end of the body, wherein the metal member has a sliding block, the sliding block is adapted to be detachably assembled to the slide rail via the entrance along a direction, the sliding block is adapted to move along the limiting portion, and the limiting portion restricts a movement of the sliding block along the direction.

2. The hand controller assembly of claim 1, wherein a sidewall of the slide rail has a plurality of first positioning structures, the sliding block has a second positioning structure, and the second positioning structure is adapted to engage with one of the first positioning structures.

3. The hand controller assembly of claim 1, wherein the sliding block has a limiting structure, and the limiting structure is adapted to engage with the limiting portion to restrict the movement of the sliding block along the direction.

4. The hand controller assembly of claim 1, wherein the slide rail has an elastic member, the elastic member is located at a bottom of the slide rail and corresponds to the entrance, when the sliding block enters the entrance, the elastic member is deformed under a pressure, and after the sliding block enters the limit portion and leaves the entrance, the elastic member is reset so as to be adapted to block the sliding block from entering the entrance.

5. The hand controller assembly of claim 1, wherein the slide rail has a first one-way tenon, the first one-way tenon and the limiting portion are respectively located at two sides of the entrance, the sliding block has a second one-way tenon, and the first one-way tenon and the second one-way tenon are adapted to cooperate with each other to restrict the movement of the sliding block along the direction.

6. The hand controller assembly of claim 1, wherein the strap further comprises a tether detachably assembled to the bottom and coupled to the body.

7. The hand controller assembly of claim 1, wherein the hand controller has a control panel, and an opening of the slide rail is located at the control panel.

* * * * *